United States Patent [19]

Yan

[11] Patent Number: 4,814,152

[45] Date of Patent: Mar. 21, 1989

[54] PROCESS FOR REMOVING MERCURY VAPOR AND CHEMISORBENT COMPOSITION THEREFOR

[75] Inventor: Tsoung Y. Yan, Philadelphia, Pa.

[73] Assignee: Mobil Oil Corporation, New York, N.Y.

[21] Appl. No.: 107,739

[22] Filed: Oct. 13, 1987

[51] Int. Cl.$^4$ .............................................. B01D 53/34
[52] U.S. Cl. ........................................ 423/210; 55/72; 55/74; 423/566.1; 502/216; 502/219; 502/222; 502/223
[58] Field of Search ................. 423/210, 561 B; 55/72, 55/74

[56] References Cited

U.S. PATENT DOCUMENTS

| | | | |
|---|---|---|---|
| 3,193,987 | 7/1965 | Manes et al. | 55/72 |
| 3,593,535 | 7/1971 | Gaumer, Jr. et al. | 62/40 |
| 3,693,323 | 9/1972 | Gant | 55/72 |
| 3,803,803 | 4/1974 | Raduly et al. | 55/72 |
| 4,101,631 | 7/1978 | Ambrosini et al. | 423/210 |
| 4,206,183 | 6/1982 | Yamada et al. | 423/210 |
| 4,338,288 | 7/1982 | Rollman | 423/561 B |
| 4,474,896 | 10/1984 | Chao | 502/216 |
| 4,491,609 | 1/1985 | Degel et al. | 427/215 |
| 4,500,327 | 2/1985 | Nishino et al. | 55/72 |
| 4,701,212 | 10/1987 | Yan et al. | 75/26 |
| 4,708,853 | 11/1987 | Matviya et al. | 423/210 |
| 4,709,118 | 11/1987 | Yan et al. | 585/820 |

FOREIGN PATENT DOCUMENTS

| | | | |
|---|---|---|---|
| 2310795 | 1/1977 | France | 423/210 |
| 1477 | 1/1975 | Japan | 423/210 |
| 238337 | 10/1986 | Japan | 423/210 |

OTHER PUBLICATIONS

Geist et al., "Predicted and Actual Temperature Profiles and Pressure Drops in Large Coil Wound, Mixed Refrigerant Heat Exchangers," LNG-6, Session II, Paper 4, Apr. 7-10, 1980, Kyoto, Japan.

*Primary Examiner*—Paul E. Konopka
*Attorney, Agent, or Firm*—Alexander J. McKillop; Charles J. Speciale

[57] ABSTRACT

A process and composition for removing elemental mercury vapor from a gas such as natural gas is disclosed. The mercury-containing gas is contacted with a solid support such as carbon containing elemental sulfur and at least one metal which catalyzes the reaction: $2 Hg + S_2 \rightleftharpoons 2 HgS$.

15 Claims, No Drawings

PROCESS FOR REMOVING MERCURY VAPOR AND CHEMISORBENT COMPOSITION THEREFOR

This invention relates to the removal of mercury vapor from gases such as natural gas.

The liquefaction of natural gas for storage and transportation and regasification for final distribution is a well established technology. Liquefied natural gas (LNG) represents an economically attractive energy option, especially for industrial nations short on domestic fuel reserves.

In the various kinds of known natural gas liquefaction systems, aluminum is often the material of choice for the construction of the cryogenic heat exchanger routinely employed in these systems due to the high thermal conductivity, excellent low temperature properties, machinability and relatively low cost of this metal. However, aluminum is susceptible to corrosion by mercury which is ordinarily present in natural gas, e.g., from as low as about 0.005 to as high as about 220 micrograms per normal cubic meter (i.e., from about $5.5 \times 10^{-3}$ to about 220 parts per billion by volume). Concentrations of mercury greater than about 0.01 micrograms per normal cubic meter are generally regarded as undesirable especially where aluminum cryogenic liquefaction equipment is concerned due to mercury's capability for forming a corrosive amalgam with aluminum. Accordingly, it is necessary to reduce elemental mercury levels to at least 0.1 micrograms per normal cubic meter and preferably less before liquefying natural gas in cryogenic gas plant equipment which is constructed from aluminum.

A number of processes and adsorbent compositions for the removal of elemental mercury vapor from a gas are known. According to U.S. Pat. No. 3,193,987, mercury present in the hydrogen gas which is produced in a mercury electrolytic cell and which is intended for the hydrogenation of fats and oils in the production of foodstuffs is removed therefrom by contact with carbon black which has been impregnated with a metal which forms an amalgam with mercury, e.g., gold, silver (especially preferred), cadmium, indium, thallium, aluminum, lead, gallium and copper.

In the demercuration process described in U.S. Pat. No. 3,803,803, the mercury-containing gas is passed through a porous material such as activated carbon, silica gel or alumina which has been impregnated with an aqueous solution of a trivalent iron salt. Mercury present in a gas or liquid is removed therefrom in the process of U.S. Pat. No. 4,094,777 by absorption on a mass such as silica, alumina, etc., containing copper in the sulfurized state. U.S. Pat. No. 4,101,631 describes the removal of elemental mercury vapor from gas streams, particularly natural gas, by selective adsorption on a sulfur-loaded zeolitic molecular sieve. U.S. Pat. No. 4,474,896 discloses a composition for the selective adsorption of elemental mercury from natural gas or other gas which is made up of a polysulfide, a support material and a metal cation capable of forming an insoluble metal polysulfide. The mercury adsorbent composition of U.S. Pat. No. 4,491,609 is a carbonaceous support such as activated coal or activated coke impregnated with elemental sulfur.

Another adsorbent disclosed in U.S. Pat. No. 4,500,327 to Nishino, et al. is an activated carbon having supported thereon (1) one or more components included in one of the three following groups: (I) sulfur, (II) sulfate and nitrate of Al, V, Fe, Co, Ni, Cu, Zn or $NH_4$ and (III) oxide of iodine, oxyacid, and bromide and iodide of K, Na or $NH_4$ and (2) one or more components included in two of the remaining groups. Nishino, et al. call for particles of sulfur to be deposited on activated carbon and then heated to at least 110° C. whereby the sulfur is oxidized and therefore primarily an adsorbent not a reactant in the demercuration process. The Nishino, et al. adsorbent suffers from being relatively slow, and from having low level demercuration capacity.

Of the foregoing demercuration processes, those based on the reaction

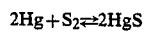

are believed to be currently the most widely used. Thus, in the case of a mercury adsorbent composition based on an elemental sulfur-impregnated carbonaceous support, e.g., that disclosed in U.S. Pat. No. 4,491,609, supra, the product HgS is solid and is retained on the carbonaceous support. However, because of thermodynamic limitations, a mercury-containing gas treated with such an adsorbent composition at a typical operating temperature of about 170° F. will still contain enough elemental mercury vapor, e.g., from about 0.01 to about 0.1 micrograms per normal cubic meter, as to still pose significant safety and maintenance problems where aluminum cryogenic equipment is concerned.

It is an object of this invention to provide a process and composition for the chemisorption of elemental mercury vapor contained in a gas such as natural gas.

It is a further object of the invention to provide such a chemisorption process and composition which utilizes a catalyst to overcome the thermodynamic limitations of the reaction: $2Hg + S_2 \rightleftharpoons 2HgS$ It is a particular object of the invention to provide a sulfur-impregnated solid support containing a catalytically effective amount of at least one metal which catalyzes the reaction: $2Hg + S_2 \rightleftharpoons 2HgS$.

SUMMARY OF THE INVENTION

In accordance with the present invention, there is provided a chemisorbent composition and process for removing elemental mercury from a gas containing same which comprises contacting the gas with a chemisorbent composition which includes a solid support, elemental sulfur and a catalytically effective amount of at least one metal which catalyzes the reaction: $2Hg + S_2 \rightleftharpoons 2HgS$. The elemental sulfur is deposited on the solid support by use of a solvent which distributes the sulfur in elemental form thereupon.

The presence of a catalytically active metal component permits the demercuration process to be carried out at a temperature significantly below the 170° F. level which is characteristic of the known procedures and overcomes the thermodynamic limitations noted above in connection with known supported sulfur chemisorbents. The catalysts of the present invention are selected from the group consisting of Ag, Au, Pd, Pt, Rh, Ir, Mn, Cr, and Mo, with Pd and Pt being the most preferred catalysts.

While the improved demercuration process and chemisorbent composition of this invention is useful for reducing the mercury content of any mercury-containing fluid, it is especially advantageously practiced in connection with the demercuration of a natural gas which is to undergo liquefaction in a cryogenic heat exchanger fabricated from aluminum. The further reduction in the levels of residual mercury present in the post-treated gas which are readily and routinely achieved in accordance with this invention provides improvement in terms of both the safety and maintenance requirements of aluminum cryogenic equipment.

Moreover, as a result of the present invention the sulfur-bearing solid support can be easily regenerated by simply burning off the unwanted mercury reactant, especially when activated carbon is used as the support material.

DESCRIPTION OF THE PREFERRED EMBODIMENTS

The present invention contemplates the use of any of the known and conventional solid support, or carrier, materials capable of supporting elemental sulfur. These materials include carbonaceous supports such as activated carbon and activated coke and refractory oxides such as silicas, aluminas, aluminosilicates, etc. Examples of the latter include zeolites such as Zeolite A (U.S. Pat. No. 2,882,243), Zeolite X (U.S. Pat. No. 2,882,244), Zeolite Y (U.S. Pat. No. 3,276,789), ZSM-5 (U.S. Pat. No. 3,702,886), and so forth. However, activated carbon is preferred.

The carrier material selected is impregnated with elemental sulfur, e.g., to contain from about 5 to about 20, and preferably from about 10 to about 15, weight percent of the latter. Thereafter, the carrier-supported sulfur chemisorbent composition is provided with a metal catalyst component capable of catalyzing the reaction: $2Hg + S_2 \rightleftharpoons 2HgS$. Suitable metals can be selected from the Group consisting of silver, gold, manganese, iridium, platinum, palladium, rhodium, molybdenum, and chromium. Platinum and palladium are preferred as they are quite catalytically active at relatively low levels of use, e.g., from about 0.01 to about 0.5 weight percent of the entire supported elemental sulfur composition. Other metals such as molybdenum and silver, while less catalytically active than platinum or palladium, remain useful but ordinarily must be present at higher levels, e.g., from about 0.5 to about 5 weight percent of the chemisorbent mass.

Preparation of the catalytically active mercury chemisorbent composition can be achieved following any one of a variety of known and conventional techniques. Thus, for example, any of the following preparative procedures can be utilized with generally good results:

1. The carrier, e.g., activated carbon, is impregnated with a solution of a compound of the catalytically active metal to the desired level. Following calcination the metal may be reduced as required or desired with hydrogen, carbon monoxide or other reducing agent to the zerovalent state, the metal supported carrier is impregnated with a solution of elemental sulfur, e.g., in carbon disulfide $CS_2$ or other suitable solvent, followed by drying to remove the solvent. It is important to dry at a temperature at which substantially no oxidation of the sulfur occurs since the basic reaction for high efficiency demercuration is oxidation by reaction with mercury.

2. The desired amount of metal compound or metal in powder and colloidal form and sulfur dissolved in a solvent such as carbon disulfide is used to impregnate the carrier. The product is then dried to eliminate the solvent. Considerations regarding drying as set forth above equally apply to this procedure.

3. A metal compound such as $H_2PtCl_6$ is impregnated on a carrier such as alumina which is dried, calcined and reduced. The product is ball milled with another carrier, such as alumina, silica or carbon and formed into shape and dried. Sulfur is impregnated as before to obtain the final catalytic absorbent.

The conditions under which the mercury-containing gas are contacted with the adsorbent composition of this invention can vary over fairly wide limits. In general, a temperature not exceeding about 170° F., and preferably not exceeding about 150° F., is entirely effective. This is especially advantageous because of the thermodynamic requirements of liquefying a gas by drastically reducing the overall temperature of the mercury-containing gas stream. Usually gas flow rates, at a range of from about 1 atmosphere (1 kg/cm$^2$) up to about 130 Kg/cm$^2$, are from about 0.01 m$^3$/sec to about 2.0 m$^3$/sec, and preferably from about 0.05 m$^3$/sec. to about 1.0 m$^3$/sec. Stated another way, the conditions under which the mercury-containing gas is brought into contact with the chemisorbent will be such as to result in a residual mercury contact in the post-treated gas of not more than about 0.1, and preferably not more than about 0.01, micrograms per normal cubic meter of gas.

The following example is illustrative of the demercuration process and adsorbent composition of the present invention.

EXAMPLE

A. Preparation of the Elemental Mercury Adsorption Composition

Granular of activated carbon, e.g., BPL 12×30 of Calgon Carbon Corporation, is impregnated with $H_2PtCl_6$ in aqueous solution. The saturated material is recovered, dried, calcined in air at 600° F. for 2 hours and subjected to hydrogen gas at 500° F. for 1 hour to effect reduction of the platinum to the metallic state. The resulting activated carbon carrier contains approximately 0.3 weight percent of platinum. Thereafter, the platinum/carbon mass is impregnated with elemental sulfur in carbon disulfide solution to sulfur level of about 12%. The saturated material is finally recovered and dried to eliminate the carbon disulfide solvent.

B. Demercuration of Natural Gas

Natural gas containing from about 200–300 micrograms of elemental mercury per normal cubic meter is passed at a temperature of about 170° F. through a bed of a mercury chemisorbent prepared as above but lacking the platinum catalyst component. The residual content of elemental mercury of the post-treated gas is about 0.1 micrograms per normal cubic meter.

The foregoing procedure is substantially repeated but with the platinum-containing chemisorbent composition described above at temperatures of 150° F. and again at 100° F. The residual content of the post-treated gas is about 0.01 and 0.001 micrograms per normal cubic meter, respectively, a significant improvement in the level of mercury removal.

As a result of the use of the sulfur and catalyst combination, the reaction can take place ideally very quickly and at lower temperatures while achieving the same desired results.

Thus, while there have been described what are presently believed to be the preferred embodiments of the invention, those skilled in the art will appreciate that other and further embodiments may be provided which come within the scope of the invention and it is intended to claim all such other embodiments which come within the true scope of the invention.

What is claimed is:

1. A process for removing mercury from a gas containing same which comprises:

providing a high surface area, inert support, said support supporting at least about 5 weight percent elemental sulfur and a catalytically effective amount of at least one metal in a metallic state; and contacting said mercury-containing gas at a temperature of not more than about 170° F. with said support, said metal catalyzing the reaction $$2Hg + S_2 \rightleftharpoons 2HgS$$

wherein mercury contained in said gas is removed therefrom.

2. The process of claim 1 wherein said gas is a natural gas.

3. The process of claim 1 wherein said support is selected from the group consisting of carbon and refractory oxide.

4. The process of claim 1 wherein said support is a zeolite.

5. The process of claim 1 wherein the metal is a metal selected from at least one of the Group consisting of Ag, Au, Ir, Mn, Cr, and Mo.

6. The process of claim 1 wherein said metal is selected from the group consisting of platinum and palladium.

7. The process of claim 1 wherein said support contains from about 5 to about 20 weight percent elemental sulfur.

8. The process of claim 1 wherein said support contains from about 10 to about 15 weight percent sulfur.

9. The process of claim 6 wherein said support contains from about 0.01 to about 0.5 weight percent metal catalyst.

10. The process of claim 5 wherein said support contains from about 0.5 to about 5 weight percent metal catalyst.

11. The process of claim 1 wherein said contact is carried out under conditions resulting in a residual elemental mercury content of the post-treated gas of not more than about 0.1 micrograms per normal cubic meter of gas.

12. The process of claim 1 wherein said contact is carried out under conditions resulting in a residual elemental mercury content of the post-treated gas of not more than about 0.01 micrograms per normal cubic meter of gas.

13. The process of claim 1 wherein said support is activated carbon.

14. The process of claim 1 wherein said contact is carried out at a temperature of not more than about 150° F.

15. The process of claim 1 wherein following said contacting step, the demercurated gas is liquefied in a cryogenic heat exchanger fabricated from aluminum.

* * * * *